US006591417B1

(12) United States Patent
Strysniewicz et al.

(10) Patent No.: US 6,591,417 B1
(45) Date of Patent: Jul. 8, 2003

(54) METHOD OF AND SYSTEM FOR TESTING COMPATIBILITY WITH AN EXTERNAL API UPGRADE

(75) Inventors: Richard E. Strysniewicz, Seabrook, TX (US); Henri W. Daumas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/475,315

(22) Filed: Dec. 30, 1999

(51) Int. Cl.[7] ............................................... G06F 9/45
(52) U.S. Cl. ....................................... 717/168; 717/173
(58) Field of Search ................................ 717/168, 173, 717/126

(56) References Cited

U.S. PATENT DOCUMENTS

| 4,953,096 A | | 8/1990 | Wachi et al. ................ 714/38 |
| 4,982,430 A | | 1/1991 | Frezza et al. ............... 380/211 |
| 5,097,533 A | * | 3/1992 | Burger et al. ............... 709/328 |
| 5,421,006 A | * | 5/1995 | Jablon et al. ............... 713/187 |
| 5,452,339 A | | 9/1995 | Siu et al. .................. 379/27.01 |
| 5,579,509 A | * | 11/1996 | Furtney et al. ............... 703/27 |
| 5,657,390 A | | 8/1997 | Elgamal et al. ............. 713/151 |
| 5,832,275 A | * | 11/1998 | Olds .......................... 707/203 |
| 6,044,398 A | * | 3/2000 | Marullo et al. ............. 709/219 |
| 6,185,701 B1 | * | 2/2001 | Marullo et al. ............... 714/38 |
| 6,289,396 B1 | * | 9/2001 | Keller et al. ................ 709/108 |
| 6,324,692 B1 | * | 11/2001 | Fiske ............................ 713/2 |
| 6,363,402 B1 | * | 3/2002 | Matsuura .................... 707/203 |
| 6,397,385 B1 | * | 5/2002 | Kravitz ....................... 709/242 |
| 6,401,220 B1 | * | 6/2002 | Grey et al. .................... 714/33 |
| 2002/0077094 A1 | * | 6/2002 | Leppanen ................... 455/420 |
| 2002/0092010 A1 | * | 7/2002 | Fiske .......................... 717/168 |

OTHER PUBLICATIONS

Rich et al., Adding a Collaborative Agent to Graphical User Interfaces, 1996, ACM, p. 21–30.*
Howell et al., An Object Oriented Application/Programmer Interface for Network Programming, 1992, ACM, p. 437–444.*

* cited by examiner

Primary Examiner—Kakali Chaki
Assistant Examiner—John Q. Chavis
(74) Attorney, Agent, or Firm—Karl O. Hesse

(57) ABSTRACT

A system for tests the compatibility of an external API upgrade with an existing user application during the installation of the API upgrade by installing the API upgrade in a temporary address space and launching a test process for each API of the API upgrade that is used by the existing user application. If the result received from each of the APIs matches the result expected from the API, the system completes installation of the API in permanent address space. If any test process terminates unexpectedly, or any result fails to match the expected result, the system notifies the user of a problem and terminates installation of the API upgrade.

15 Claims, 2 Drawing Sheets

METHOD OF AND SYSTEM FOR TESTING COMPATIBILITY WITH AN EXTERNAL API UPGRADE

FIELD OF THE INVENTION

The present invention relates generally to the field of software application installation tools, and more particularly to a method of and system for testing the compatibility of an external application program interface (API) upgrade with an existing user application program during installation of the external API upgrade.

DESCRIPTION OF THE PRIOR ART

In today's software systems, one application may rely one or more separate applications for various services. An application interfaces with the other application or applications through application program interfaces (APIs). Such application integration allows an application to provide services without having to include the programming and data necessary to provide the services itself.

For example, a retail application may rely on a separate postal ZIP code database application for address and ZIP code verification. The database vendor provides APIs to access the database information, and these APIs are built in their own dynamic link library (DLL). The retail application is written to load that DLL and use those APIs.

Software is typically upgraded periodically to include new or improved features. In the ZIP code database application example, the database and APIs may be updated monthly. The updated ZIP code database application may be sent directly to literally thousands of users of the retail application. One problem that can result is that the updated APIs may not be compatible with the retail application. Such incompatibility may cause the retail application to function incorrectly or not to function at all. Currently, during the upgrade process, the users must either install the upgrade and hope that all of the APIs are compatible, or wait until the upgrade has been fully tested for compatibility in a lab. Installing the upgrade blindly without testing is risky, particularly when thousands of users are involved. Lab testing of each upgrade is vulnerable to human error and can be impractical when the upgrades are performed frequently and there are many user to notify of the upgrade test results.

SUMMARY OF THE INVENTION

The present invention provides a method of and system for testing the compatibility of an external API upgrade with an existing user application during the installation of the API upgrade on an individual computer system. The system of the present invention installs the API upgrade in a temporary address space. Then, the system launches a test process for each API of the API upgrade that is used by the existing user application. If the result received from each of the APIs matches the result expected from the API, the system completes installation of the external API in permanent address space. If any test process terminates unexpectedly, or any result fails to match an expected result, the system notifies the user of a problem and terminates installation of the external API upgrade.

DESCRIPTION OF THE PREFERRED EMBODIMENT

Figure 1:
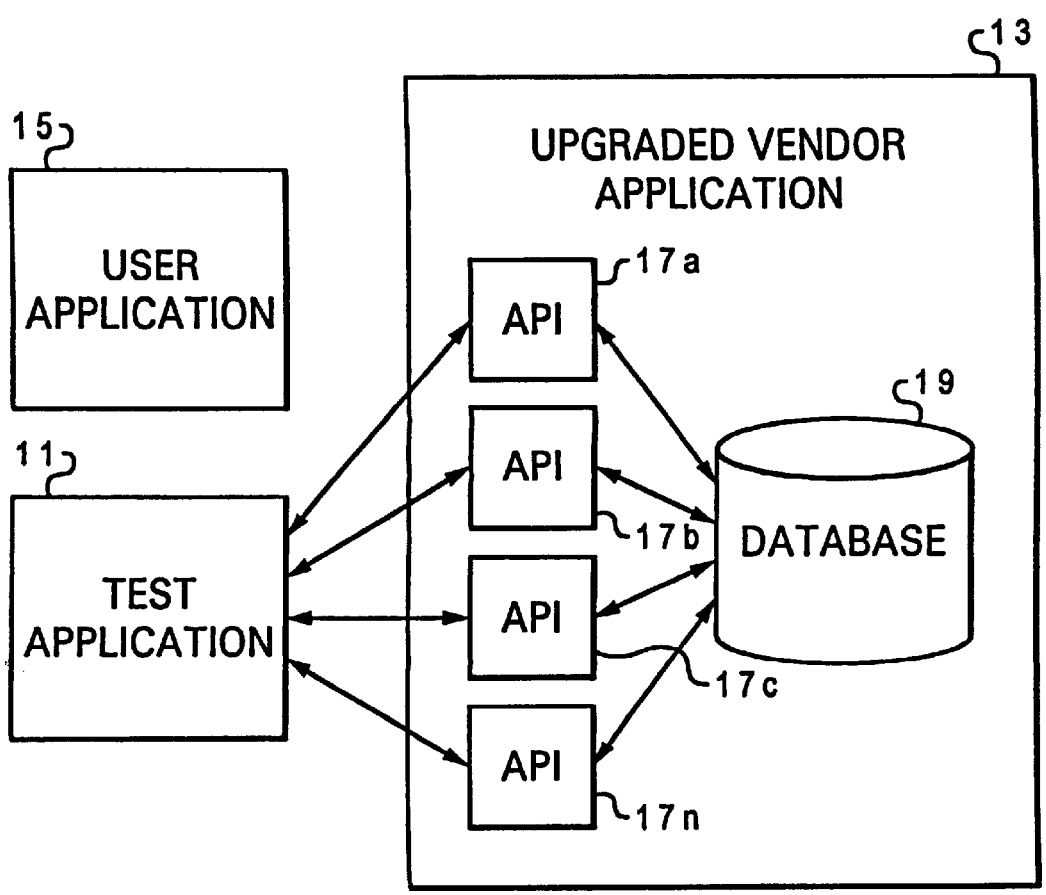
FIG. 1 is a block diagram illustrating the structure of the present invention.

Referring now to the drawings, and first to FIG. 1, the system of the present invention provides a test application 11 that functions as a tool for use during installation of an upgraded vendor application 13 in a computer system. As will be explained in detail hereinafter, test application 11 tests the compatibility of upgraded vendor application 13 with a user application 15.

User application 15 may be any application program. For example, user application 15 may be a retail application that provides a multitude of services to retail users. Some of the services may be provided by programming and data native to user application 15 and other services may be provided by programming and data resident in other application programs, such as upgraded vendor application 13. In the retail application example, upgraded vendor application may be a ZIP code application that user application 15 accesses for address and ZIP code verification and other services.

Upgraded vendor application 13 includes, among other things, a plurality of application program interfaces (APIs) 17 and a database 19. User application 15 access database 19 by means of APIs 17.

In upgraded vendor application 13, the contents of database 19 and/or the APIs 17 may be changed over those of a prior version. Any changes in APIs 17 may cause upgraded vendor application 13 not to be compatible with user application 15. If an incompatible upgraded vendor application 13 is installed with user application 15, user application 15 in all likelihood will not function properly at least with respect to the function provided with the applicable API 17. In the worst case, user application 15 may not function at all.

According to the present invention, during installation of upgraded vendor application 13, test application 11 installs upgraded vendor application 13 in temporary address space, and tests the compatibility of each API 17 of upgraded vendor application 13 used by user application 15. Test application 11 includes code and data for generating a test process to exercise each API 17 of upgraded vendor application 13 used by user application 15. A test process is initiated by test application 11 in the same manner as a call to the API by user application 15. The call is in the language and syntax of user application 15 and it includes sample arguments or parameters. For example, a retail application may rely on a postal ZIP code application for address and ZIP code verification.

Stored within test application 11 is an expected return value for each process. For example, the API process under test may return a ZIP code in response to an address. Thus, test application expects to receive a return of a particular ZIP code, in a particular syntax, in response to a particular query. According to the present invention, test application 11 compares the value returned by the API. If the value returned is identical to the expected return value, then the API of the process under test is deemed to be compatible with user application 15. If all the APIs 17 used by user application 15 are found to be compatible, then test application 11 completes the installation of upgraded vendor application 13 in permanent address space.

Figure 2:
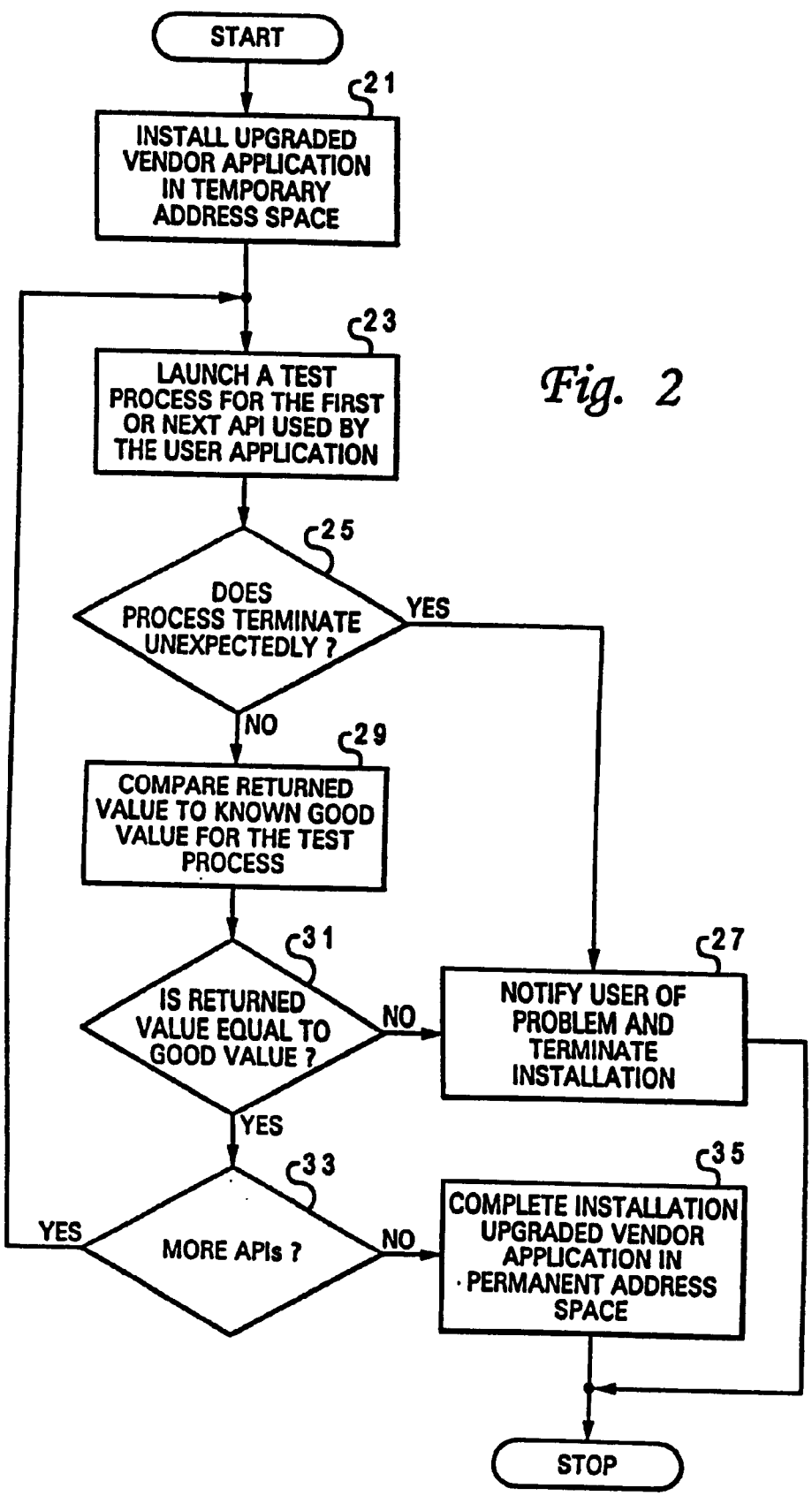
FIG. 2 is a flowchart of processing according to the present invention.

Referring now to FIG. 2, there is shown of a high level flowchart of processing performed by test application 11. First, the test application installs the upgraded vendor application in temporary address space, at block 21. Then, the test application launches a test process for the first or next API used by the user application, at block 23, and implicitly waits for the process to complete. If, as determined at decision block 25, the process terminates unexpectedly, the test application notifies the user of a problem and terminates the installation, at block 27. If the process completes, the test application compares the value returned by the API to expected good value, at block 29. The test application then tests, at decision block 31, if the returned value is equal to the expected value. If not, processing proceeds to block 27. If the returned value is equal to the expected value, then the test application determines, at decision block 33, if there are any more APIs to test. If so, processing continues at block 23. If, at decision block 33, there are no more APIs to test, the test application completes installation of the upgraded vendor application in permanent address space, at block 35, and processing ends.

From the foregoing, it may be seen that the present invention overcomes the shortcomings of the prior art. The present invention provides a method of and system for testing the compatibility of an external API upgrade with an existing user application during installation of the upgrade on the individual computer system upon which the existing user application is installed. If the upgrade is found to be compatible, the system of the present invention completes the installation. If the upgrade is found not to be compatible, the user is notified of the problem and installation of the upgrade is not completed.

What is claimed is:

1. A method of testing compatibility of an external API upgrade with an existing user application, which comprises the steps of:

installing the API upgrade, said API upgrade including at least one API, in a temporary address space;

launching a process that will call or exercise said at least one API;

comparing a result received from said at least one API with a known good value for said process.

2. The method as claimed in claim 1, wherein said API upgrade includes a plurality of APIs, and said method includes the steps of:

launching a process for each said API; and, comparing a result received from each said API with a known good value for said process.

3. The method as claimed in claim 1, including the step of:

installing said API in a permanent address space if said result received from said at least one API matches said known good value.

4. The method as claimed in claim 1, including the step of:

terminating installation of said API upgrade if said process for said at least one API terminates unexpectedly.

5. The method as claimed in claim 1, including the step of:

terminating installation of said API upgrade if said result received from said at least one API does not match said known good value.

6. A method of installing an external API upgrade in a computer system, which comprises the steps of:

installing said API upgrade in temporary address space of said computer system;

testing the compatibility of said API upgrade with an exiting user application in said computer system; and, completing installation of said API upgrade in permanent address space of said computer system if said API upgrade is compatible with said exiting user application.

7. The method as claimed in claim 6, wherein said step of testing the compatibility of said API with said existing user application includes the steps of:

launching a process for an API of said API upgrade; and, comparing the result received from API with a known good value.

8. The method as claimed in claim 6, wherein said step of testing the compatibility of said API with said existing user application includes the steps of:

launching a process for each API of said API upgrade used by said exiting application; and, comparing the result received from said each API with a known good value.

9. A method of testing the compatibility of an external API upgrade with an existing user application, which comprises the steps of:

creating a test process for each API of said API upgrade used by said existing user application;

determining an expected result for said each API of said API upgrade used by said existing user application;

installing said API upgrade in a temporary address space;

launching each test process; and, receiving a result for each test process.

10. The method as claimed in claim 9, including the step of:

comparing the result received for each test process with the expected result for said test process.

11. The method as claimed in claim 10, including the step of:

completing installation of said API upgrade if the result received for each test process matches the expected result for said test process.

12. The method as claimed in claim 11, including the step of:

terminating installation of said API upgrade if any result received for a test process fails to match the expected result for said test process.

13. A system for testing the compatibility of an external API upgrade with an existing user application, which comprises:

means for launching a test process for each API of said API upgrade used by said existing user application;

means for storing an expected result for said each API of said API upgrade used by said existing user application; and, means for comparing the result received for each test process with the expected result for said test process.

14. The system as claimed in claim 13, including means for installing said API upgrade in temporary address space.

15. The system as claimed in claim 13, including means for installing said API upgrade in permanent address space if the result received for each test process matches the expected result for said test process.

* * * * *